United States Patent [19]

Chen

[11] Patent Number: 5,165,264
[45] Date of Patent: Nov. 24, 1992

[54] TELESCOPIC LOCK DEVICE FOR A STEERING WHEEL IN AN AUTOMOBILE

[76] Inventor: Chiu-Lin Chen, No. 46, Alley 38, Lane 103, Yen-Cheng Rd., Tainan City, Taiwan

[21] Appl. No.: 821,058

[22] Filed: Jan. 16, 1992

[51] Int. Cl.⁵ .............................................. B60R 25/02
[52] U.S. Cl. ......................................... 70/209; 70/226
[58] Field of Search ................. 70/209, 211, 212, 225, 70/226, 237, 238

[56] References Cited

U.S. PATENT DOCUMENTS

| 5,031,428 | 7/1991 | Jan et al. ............................. | 70/226 X |
| 5,040,388 | 8/1991 | Chen ................................... | 70/226 X |

Primary Examiner—Lloyd A. Gall

[57] ABSTRACT

A telescopic lock device is used for locking a steering wheel in an automobile and includes an elongated tubular lock body, a central rod secured coaxially in the lock body, and a telescopic tube slidable axially between the lock body and the central rod. When a key is inserted into the key driven unit of the lock body, the rotation of the key can move a movable element into the central bore of the lock body to engage in a selected one of a row of axially aligned notches in the telescopic tube so as to lock the telescopic tube on the lock body. Each of the lock body and the telescopic tube has a forked paw portion which rides on the rim of the steering wheel so as to retain the telescopic lock device on the steering wheel.

2 Claims, 6 Drawing Sheets

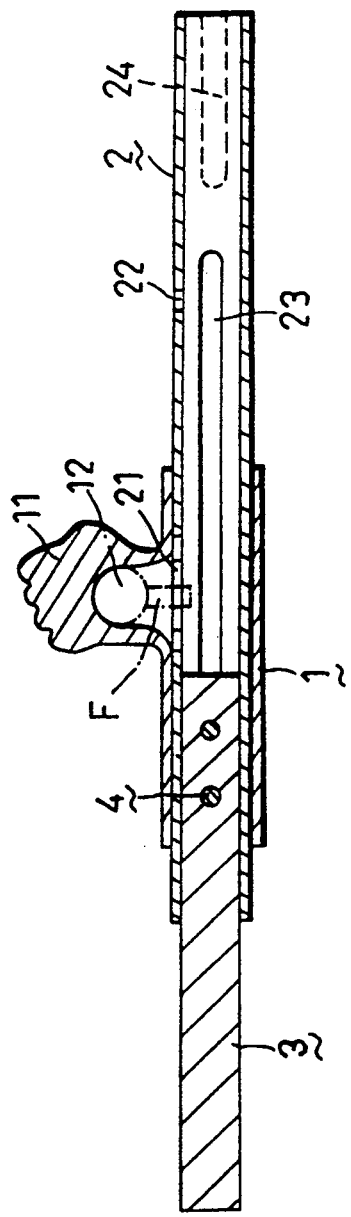
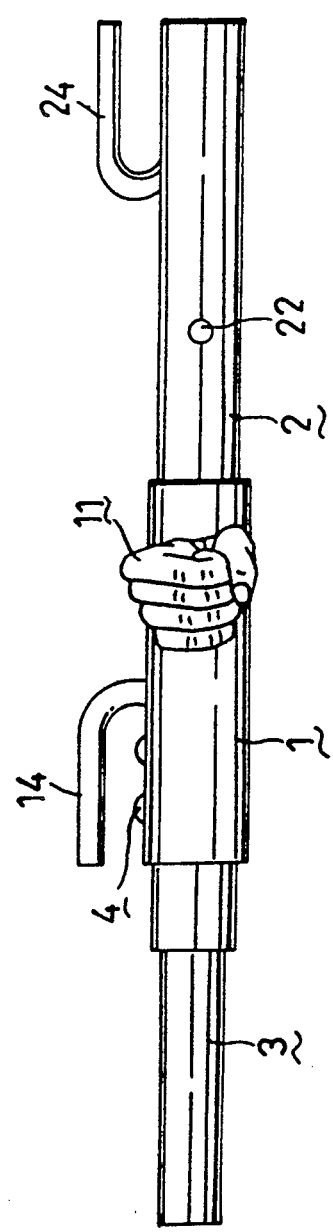
FIG.5
FIG.6

TELESCOPIC LOCK DEVICE FOR A STEERING WHEEL IN AN AUTOMOBILE

BACKGROUND OF THE INVENTION

1. Field of the Invention

This invention relates to a telescopic lock device for a steering wheel in an automobile, more particularly to a lock device which can be easily mounted on the steering wheel of the automobile.

2. Description of the Related Art

The improvement of this invention is directed to the conventional telescopic lock device shown in FIGS. 1 and 2, which includes a lock body (A), a telescopic tube (B) and a telescopic rod (C). The lock body (A) has a bore (A1) formed in an end surface thereof, a first U-shaped paw element (A2) welded to the lock body (A), and a key driven unit (A3). The telescopic tube (B) has a row of axially aligned locking notches (B1) intercommunicated with each other, and a second U-shaped paw element (B2) welded to the telescopic tube (B). The telescopic rod (C) has a row of consecutive positioning sections (C1) each of which consists of a conic portion (C11) and a shoulder (C12).

When the telescopic tube (B) and the telescopic rod (C) are moved to the positions shown in FIG. 3, in which the U-shaped paw elements (A2, B2) ride on the rim of the steering wheel (D), a key (not shown) is inserted into the key driven unit (A3). The rotation of the key moves a movable element (not shown) in the lock body (A) to extend through a selected one of the locking notches (B1) of the telescopic tube (B) so as to engage in a selected one of the positioning sections (C1) of the telescopic rod (C). Accordingly, the telescopic lock device is retained on the steering wheel (D) so as to enable synchronous rotation of the telescopic lock device with the steering wheel (D). Furthermore, in the illustrated position, the telescopic rod (C) is blocked by the automobile frame (E) so that the steering wheel (D) cannot be rotated. Since both the telescopic tube (B) and the telescopic rod (C) are slidable relative to the lock body (A), it is difficult to mount the telescopic lock device on the steering wheel (D).

SUMMARY OF THE INVENTION

It is therefore the main object of this invention to provide a telescopic lock device for a steering wheel in an automobile which can be easily mounted on the steering wheel.

According to this invention, a telescopic lock device is used for locking a steering wheel in an automobile and includes an elongated tubular lock body, a central rod secured coaxially in the lock body, and a telescopic tube slidable axially between the lock body and the central rod. When a key is inserted into the key driven unit of the lock body, the rotation of the key can move a movable element into the central bore of the lock body to engage in a selected one of a row of axially aligned locking notches in the telescopic tube so as to lock the telescopic tube on the lock body. Each of the lock body and the telescopic tube has a forked paw portion which rides on the rim of the steering wheel so as to retain the telescopic lock device on the steering wheel.

BRIEF DESCRIPTION OF THE DRAWING

Other features and advantages of this invention will become apparent in the following detailed description of a preferred embodiment of this invention, with reference to the accompanying drawings, in which:

FIG. 5 is a sectional view showing the telescopic lock device of this invention;

FIG. 6 is a top view showing the telescopic look device of this invention; and

DETAILED DESCRIPTION OF THE PREFERRED EMBODIMENT

Figure 1:
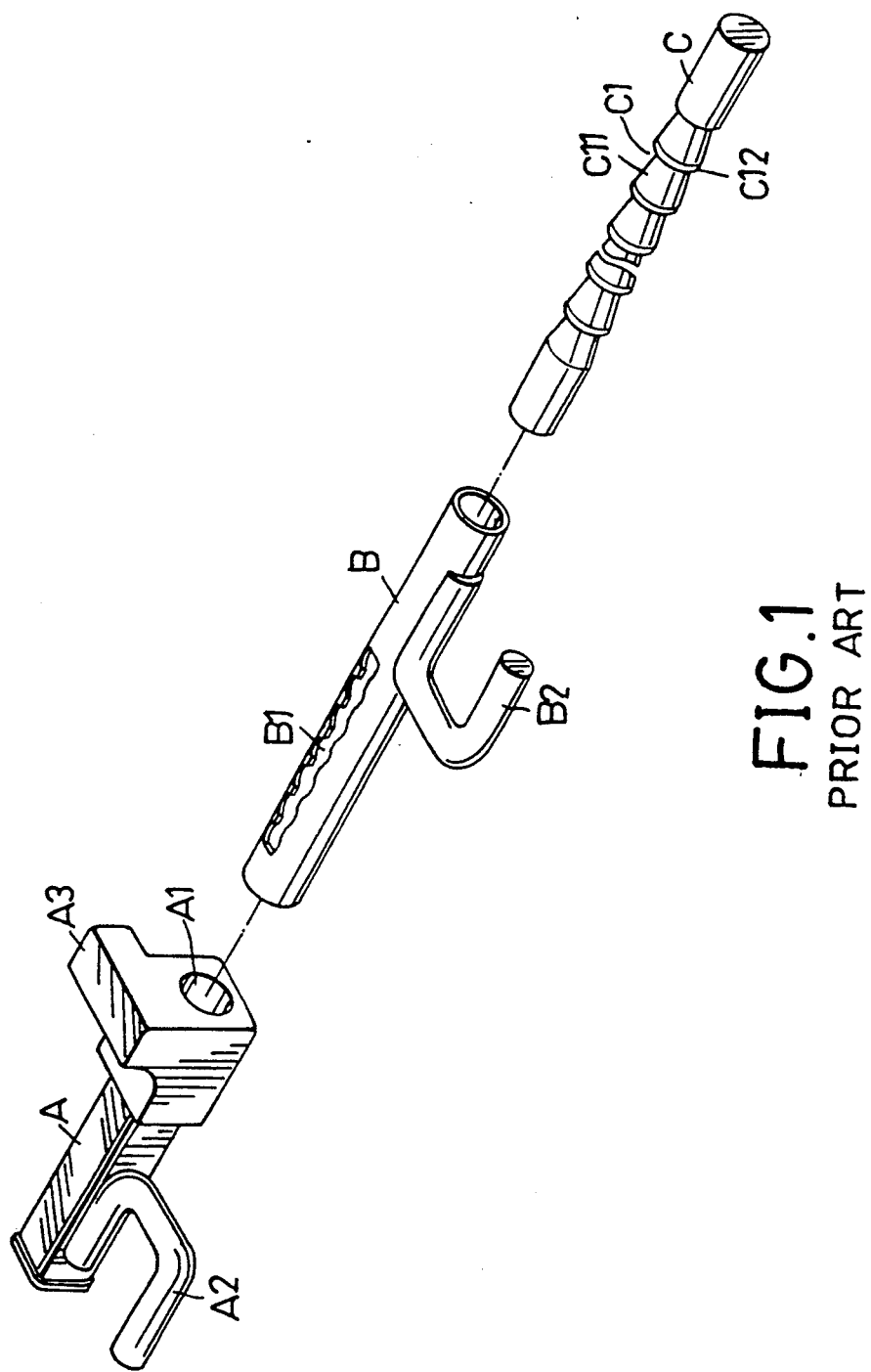
FIG. 1 is an exploded perspective view showing a conventional telescopic lock device for a steering wheel in an automobile.
Figure 2:
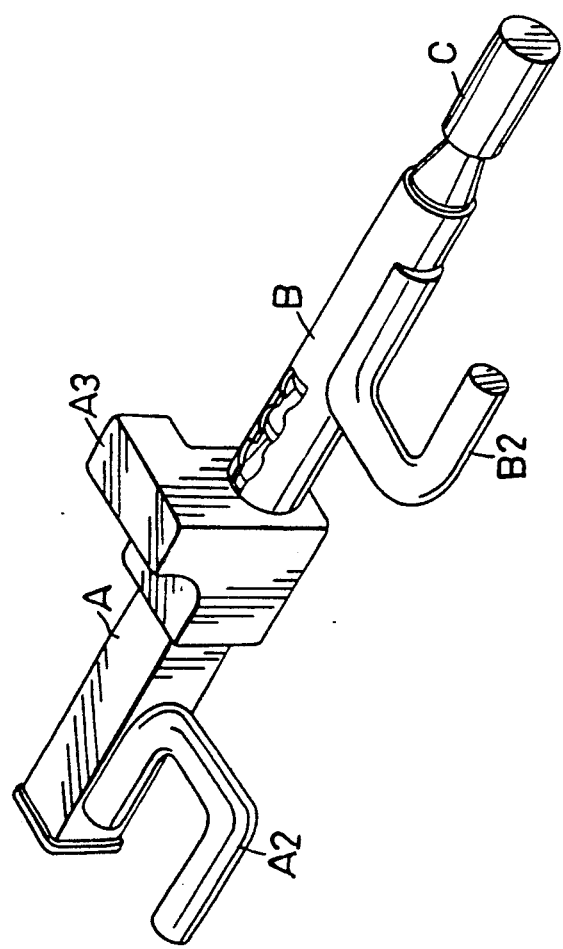
FIG. 2 is an assembled perspective view showing the conventional telescopic lock device.
Figure 3:
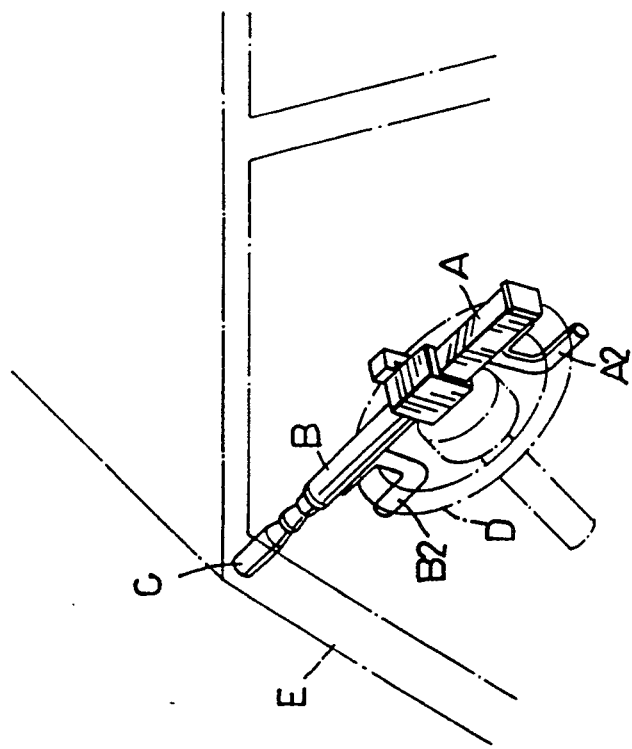
FIG. 3 is a schematic view illustrating the use of the conventional telescopic lock device.
Figure 4:
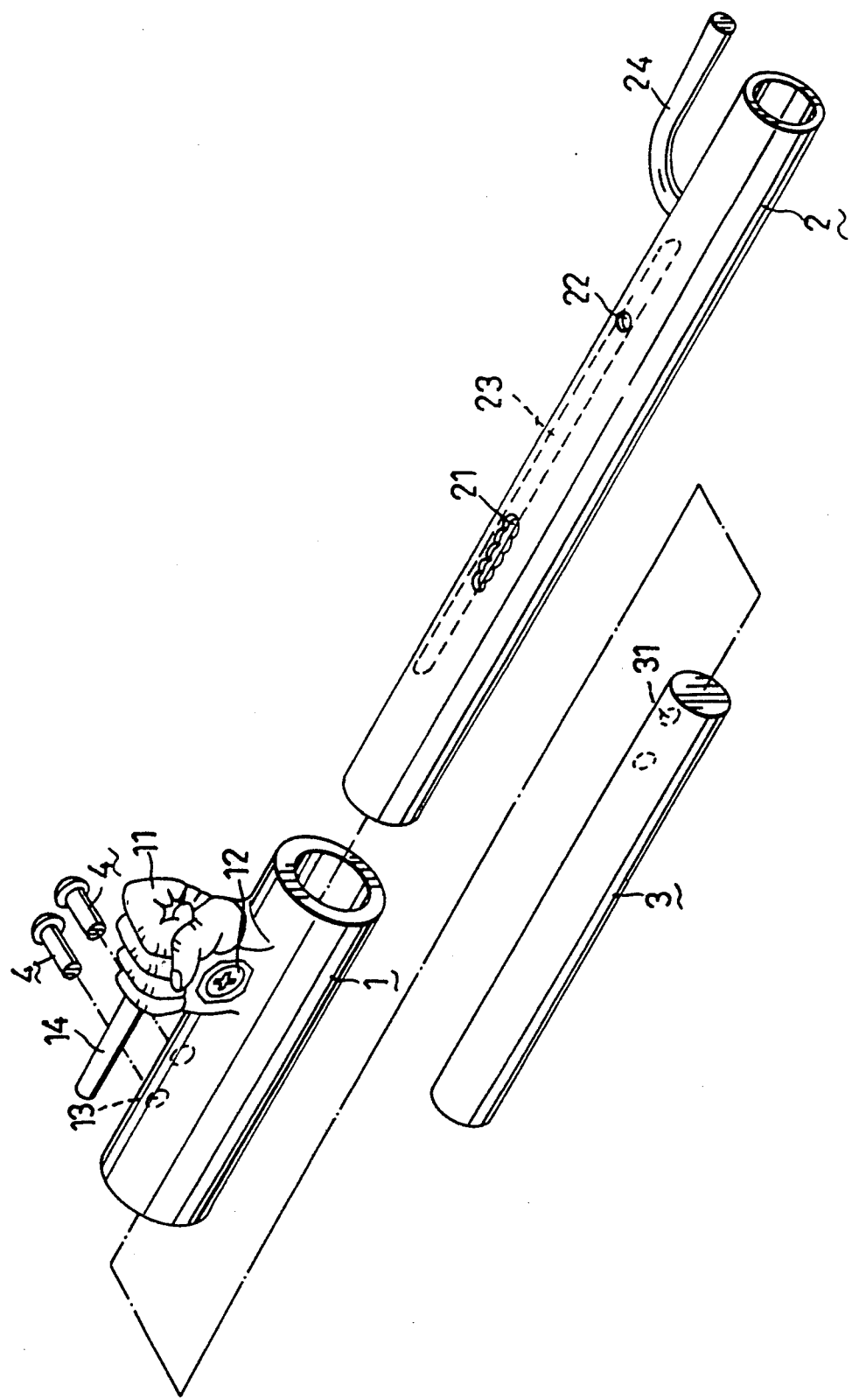
FIG. 4 is an exploded perspective view showing a telescopic lock device for a steering wheel in an automobile according to this invention.

Referring to FIGS. 4 and 5, a telescopic lock device of this invention includes an elongated tubular lock body (1), a telescopic tube (2) and a central rod (3).

One end portion of the lock body (1) has a key driven unit (11) with a keyhole and keyway assembly (12). The other end portion of the lock body (1) includes a pair of first rivet holes (13) and a first U-shaped paw element (14) which is welded to the lock body (1) so as to constitute a forked paw portion. A movable element (F) (see FIG. 5) is interposed between the keyhole and keyway assembly (12) and the central bore of the lock body (1) in a known manner.

An end portion of the telescopic tube (2) includes an insertion portion having a row of axially aligned locking notches (21) which are intercommunicated with each other. A circular hole (22) is formed in the telescopic tube (2) in alignment with the locking notches (21). An axially extending slide slot (23) is formed through a wall of the telescopic tube (2). A second U-shaped paw element (24) is welded to the telescopic tube (2) so as to constitute a forked paw portion. The central rod (3) has a pair of second rivet holes (31). A pair of rivets (4) extend through the first rivet holes (13) of the lock body (1), the slide slot (23) of the telescopic tube (2) and the second rivet holes (31) of the central rod (3) so as to secure the central rod (3) in the lock body (1). A slideway is formed between the lock body (1) and the central rod (3) so that the insertion portion of the telescopic tube (2) slides therein. Because the rivets (4) extend through the slide slot (23) of the telescopic tube (2), the telescopic tube (2) cannot rotate relative to the lock body (1).

Figure 7:
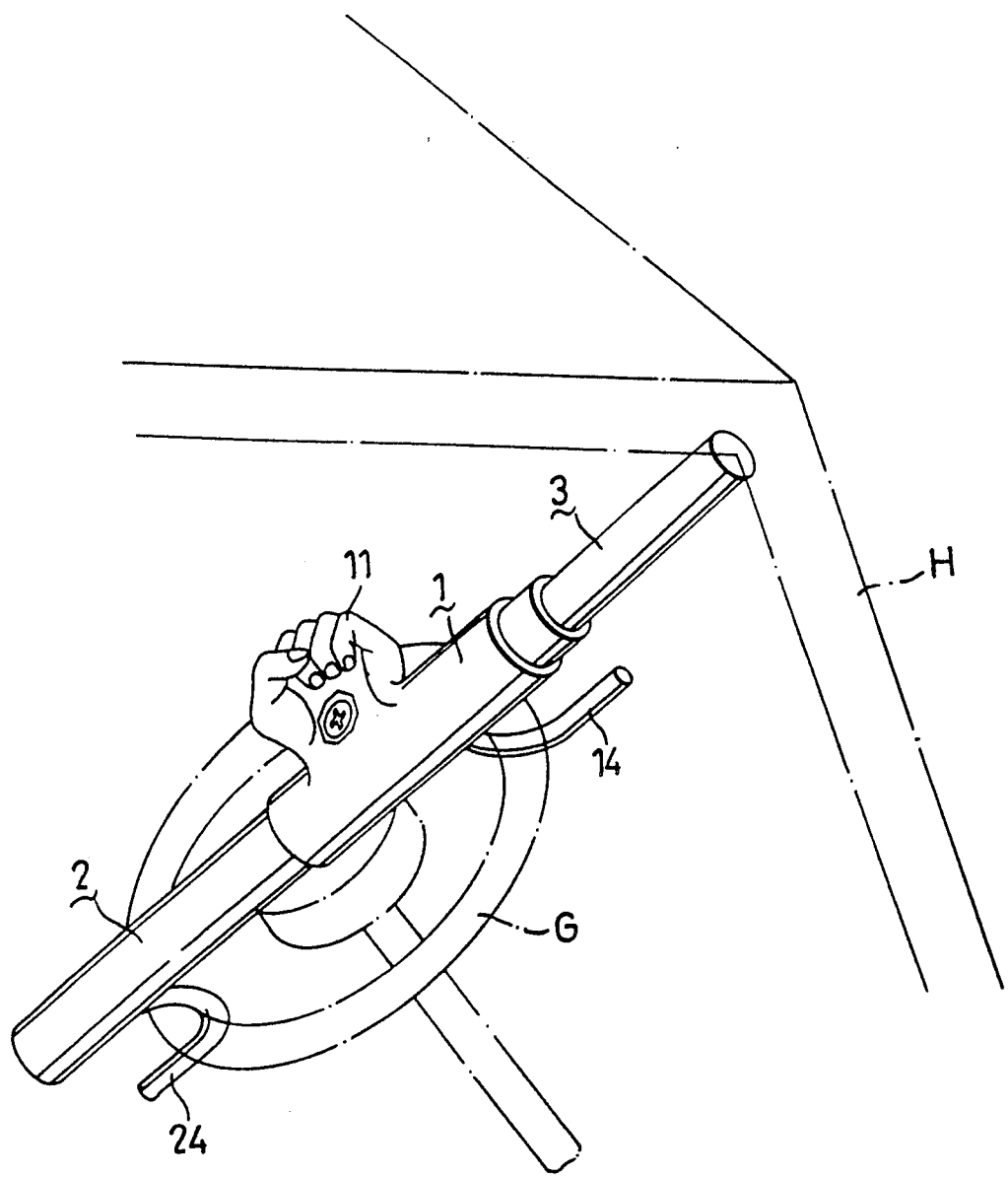
FIG. 7 is a schematic view illustrating the use of the telescopic lock device of this invention.

When the telescopic tube (2) is moved relative to the lock body (1) to the position shown in FIG. 7, a key (not shown) can be inserted into the keyhole and keyway assembly (12). At this time, the rotation of the key moves the movable element (F) to engage one of the locking notches (21) of the telescopic tube (2) so as to lock the telescopic tube (2) on the lock body (1). In this condition, the forked paw portions of the lock body (1) and the telescopic tube (2) ride on the rim of the steering wheel (G) so as to retain the telescopic lock device on the steering wheel (G). As shown in FIG. 7, the telescopic lock device is blocked by the automobile frame (H) so that the steering wheel (G) cannot be rotated. Because only the telescopic tube (2) is slidable relative to the lock body (1), the telescopic lock device can be easily mounted on the steerinq wheel (G).

When the telescopic lock device is not in use, the telescopic tube (2) is moved to a position in which the rotation of the key moves the movable element (F) to engage within the circular hole (22) of the telescopic tube (2) so as to reduce the length of the telescopic lock device.

With this invention thus explained, it is apparent that numerous modifications and variations can be made without departing from the scope and spirit of this invention. It is therefore intended that this invention be limited only as indicated in the appended claims.

I claim:

1. A telescopic lock device for a steering wheel in an automobile, comprising:

an elongated tubular lock body having a forked paw portion disposed at one end portion thereof, and a key driven unit disposed at the other end portion thereof, said key driven unit including a movable element adapted to be activated by a key to move in said lock body;

a central rod;

a fastening unit securing said central rod coaxially in said lock body so as to form a slideway between said lock body and said central rod;

a telescopic tube having a forked paw portion disposed at one end portion thereof, an insertion portion disposed at the other end portion thereof and slidable within said slideway so as to adjust distance between said forked paw portions of said lock body and said telescopic tube, and a row of axially aligned locking notches formed through a wall of said telescopic tube;

means for preventing rotation of said telescopic tube relative to said lock body;

whereby, when the key is inserted into said key driven unit and is rotated, said movable element of said key driven unit extends into said lock body to engage in a selected one of said locking notches of said telescopic tube so that said forked paw portions of said lock body and said telescopic tube ride on a rim of the steering wheel, thereby retaining said telescopic lock device on the steering wheel; and said fastening unit includes:

a first rivet hole formed in said lock body;

a second rivet hole formed in said central rod; and a rivet element extending through said first rivet hold and said second rivet hole.

2. A telescopic lock device as claimed in claim 1, wherein said means for preventing rotation of said telescopic tube relative to said lock body includes an axially extending slide slot formed through a wall of said telescopic tube, said rivet element extending through said slide slot.

* * * * *